US009645882B2

(12) United States Patent
Bertacco et al.

(10) Patent No.: US 9,645,882 B2
(45) Date of Patent: May 9, 2017

(54) FIELD REPAIRABLE LOGIC (75) Inventors: Valeria Bertacco, Ann Arbor, MI (US); Todd Michael Austin, Ann Arbor, MI (US); Ilya Wagner, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1610 days.

(21) Appl. No.: 12/178,257

(22) Filed: Jul. 23, 2008

(65) Prior Publication Data
US 2009/0089615 A1 Apr. 2, 2009

Related U.S. Application Data (60) Provisional application No. 60/951,564, filed on Jul. 24, 2007.

(51) Int. Cl.
*G06F 11/08* (2006.01)

(52) U.S. Cl.
CPC ..................... *G06F 11/08* (2013.01)

(58) Field of Classification Search
CPC ...... G06F 9/382; G06F 9/3861; G06F 9/4812; G06F 11/3466
USPC .......................................................... 714/10
See application file for complete search history.

(56) References Cited

U.S. PATENT DOCUMENTS

| 4,642,631 A * | 2/1987 | Rak .............................. 340/5.26 |
| 5,253,255 A | 10/1993 | Carbine |
| 5,748,873 A * | 5/1998 | Ohguro ................. G06F 11/165 714/10 |
| 5,796,974 A | 8/1998 | Goddard et al. |
| 6,029,263 A * | 2/2000 | Gibson .......................... 714/726 |
| 6,378,097 B1 * | 4/2002 | Fin et al. ....................... 714/738 |
| 6,438,664 B1 | 8/2002 | McGrath et al. |
| 2004/0044925 A1 * | 3/2004 | Piper et al. ...................... 714/30 |
| 2004/0216104 A1 * | 10/2004 | Fluhr et al. .................... 718/100 |
| 2006/0247708 A1 * | 11/2006 | Yost et al. ........................ 607/28 |
| 2007/0050610 A1 * | 3/2007 | Tran et al. ..................... 712/236 |
| 2007/0143323 A1 * | 6/2007 | Vanrenen et al. ............ 707/101 |

OTHER PUBLICATIONS

Allan et al., 2001 Technology Roadmap for Semiconductors, IEEE, 2002, pp. 42-53.
Bentley et al., Validating The Intel Pentium 4 Processor, Intel Technology Journal Q1, 2001, pp. 1-8.
Bentley, Validating The Intel Pentium 4 Microprocessor, DAC, 2001, pp. 244-248.
Narayanasamy et al., Patching Processor Design Errors, University of California, pp. 1-8.

(Continued)

*Primary Examiner* — Jigar Patel
(74) *Attorney, Agent, or Firm* — Brooks Kushman P.C.

(57) ABSTRACT

A state matcher for a logic circuit may detect at least one of a buggy state of the logic circuit, a precursor to a buggy state of the logic circuit and a verified state of the logic circuit based on a plurality of signal values indicative of a state of the logic circuit. A recovery controller for a microprocessor may reconfigure the microprocessor to a trusted feature mode in response to receiving a signal indicating that the microprocessor is in a predefined state and operate the microprocessor in the trusted feature mode for a predetermined period of time.

9 Claims, 5 Drawing Sheets (56) References Cited

OTHER PUBLICATIONS

Van Campenhout et al., Collection and Analysis of Microprocessor Design Errors, IEEE, 2000, pp. 51-60.
Chang et al., Simulation-Based Bug Trace minimization With BMC-Based Refinement, IEEE, 2007, pp. 152-165.
Ho et al., Smart Simulation Using Collaborative Formal and Simulation Engines, IEEE, 2000, pp. 120-126.
Sarangi et al., Patching Processor Design Errors With Programmable Hardware, IEEE, 2007, pp. 12-25.
Wagner et al., StressTest: An Automatic Approach to Test Generation via Activity Monitors, The University of Michigan, 2005, pp. 1-6.
Sarangi et al., Phoenix: Detecting and Recovering From Permanent Processor Design Bugs With Programmable Hardware, University of Illinois, 2006, pp. 1-12.

\* cited by examiner

FIELD REPAIRABLE LOGIC

CROSS-REFERENCE TO RELATED APPLICATION

This application claims the benefit of U.S. Provisional Application No. 60/951,564, filed Jul. 24, 2007, of which FIGS. 1 through 18, FIGS. 26 through 46 and the brief description of FIGS. 1 through 18 on pages 12 through 15 of the Provisional Application are expressly incorporated herein by reference.

STATEMENT REGARDING FEDERALLY SPONSORED RESEARCH OR DEVELOPMENT

This invention was made with government support under HR0011-04-3-0002 awarded by the Defense Advanced Research Projects Agency. The government has certain rights in the invention.

BACKGROUND

End-users of certain microprocessor-based products rely on the hardware system to function correctly all the time and for every task. To meet this expectation, microprocessor design houses perform extensive validation of their designs before production and release to the marketplace. The success of this process may be important to the survival of the company, as the financial impact of microprocessor bugs can be devastating.

Designers address correctness concerns through verification, the process of extensively validating all the functionalities of a design throughout the development cycle. Simulation-based techniques are central to this process: they exercise a design with relevant test sequences in the attempt to expose latent bugs. This approach is used extensively in the industry, yet it suffers from a number of drawbacks. First, simulation-based verification is a non-exhaustive process: the density of states in modern microprocessors is too large to allow for the entire state space to be fully exercised. For example, a simple out-of-order processor core may have 128 inputs signals, 31 64-bit registers and additional control states for a total of $2^{10441}$ distinct configurations, each with up to $2^{128}$ outgoing edges connecting to other configurations. In contrast, the verification of the Pentium 4, which utilized a simulation pool of 6,000 workstations, was only able to test 2 states prior to tape-out.

Formal verification techniques have grown to address the non-exhaustive nature of simulation-based methods. Formal methods (such as theorem provers and model checkers) enable an engineer to reason about the correctness of a hardware component, regardless of the programs and storage state impressed upon the design. In some scenarios, it is possible to prove that a design will not exhibit a certain failure property, or that it will never produce a result that differs from a known-correct reference model. The primary drawback of formal techniques, however, is that they do not scale to the complexity of modern designs, limiting their deployment and benefit to only a few components within the overall design. For example, the verification of the Pentium 4 heavily utilized formal verification tools, but their use was limited to proving properties of the floating-point units, the instruction decoders and the dynamic scheduler.

Unfortunately, the situation seems to be deteriorating in the presence of seemingly unending design complexity scaling, which is in contrast with the much slower growth of the capabilities of verification tools, leading to what is referred to as the "verification gap." In the end, processor designs are released not fully tested, and hence, with latent bugs.

DETAILED DESCRIPTION

Escaped Bugs and in-Field Repair

Escaped Errors in Commercial Processors

Despite the efforts of processor design houses to build correct designs, bugs do escape the verification process. In this section, reported escaped errors of a number of commercial processors are examined. These bugs are classified and it is shown that a fairly large fraction of them is related to the control portion of the design.

Errors may be classified into one of the following categories:

Processor's control logic: These bugs are the result of incorrect decisions made at the occurrence of important execution events, and of interactions between simultaneous events. An example of this type of escape may be found in the Opteron processor, where a reverse REP MOVS instruction may cause the following instruction to be skipped.

Functional units: These are design errors in units which can cause the production of an incorrect result. This category includes bugs in such components as branch predictors and translation lookaside buffers (TLBs). An example of this type of bug is the Pentium FDIV bug, where a lookup table used to implement a divider SRT (Sweeney, Robertson and Tocher) algorithm contained incorrect entries.

Memory system control: These are bugs in the implementation of the on-chip memory system, including caches, memory interface, etc. An example of this type of bug is an error in the Pentium III processor, where certain interactions of Instruction Fetch Unit and Data Cache Unit could hang the system.

Microcode: These are (software) bugs in the implementation of the microcode for a particular instruction. An example may be found in the 386 processor, where microcode incorrectly checked the minimum size of the TSS (task state segment), which must be 103 bytes, but, due to a flaw, segments of 101 and 102 bytes were also incorrectly allowed.

Electrical faults: These are design errors occurring when certain logic paths do not meet timing under exceptional conditions. Consequently, if a processor runs well below its specified maximum frequency, these faults will often not occur. An example is the Load Register Signed Byte (LDRSB) instruction of the StrongARM SA-1100 which does not meet timing when reading from the pre-fetch buffer.

As the above analysis demonstrates, control logic escapes dominate the errata reports for these processors. The high frequency of such escapes can be explained by the complexity of the control logic blocks that handle interactions between multiple instructions and the inability of formal techniques to handle complex interactions between multiple logic blocks in a design. Correctness of the datapath, on the other hand, can frequently be proven formally. In certain techniques discussed herein, this capability is used to prove a datapath's correctness when no control logic interactions are present in the system.

Functional correctness may be an attribute of hardware designs. Unfortunately, due to extremely complex architectures, widespread components, such as microprocessors, are often released with latent bugs. The inability of modern verification tools to handle the fast growth of design complexity may exacerbate the problem even further.

Here, embodiments of a hardware patching mechanism, some times referred to as field-repairable logic (FRL), is described. It may be designed for in-the-field correction of errors in microprocessor systems, for example, but not exclusively, errors in the design's control logic and errors due to the interaction between multiple instructions in execution at the same time.

Certain embodiments introduce an additional component in the processor's hardware, a state matcher, that may be programmed to identify erroneous configurations using signals in the control state of the processor. Once a flawed configuration is "matched", the processor may switch, for example, into a degraded or trusted mode, a mode of operation, in some embodiments, which excludes most features of the system, is simple enough to be formally verified, yet still capable to execute the full instruction-set architecture (ISA), possibly at a reduced performance level. Once the program segment triggering the design flaw has been executed while in degraded mode, the processor may be switched back to the mode of execution in which it was operating before the configuration was "matched", or to another mode of execution.

In other embodiments the state matcher may be programmed to encode processor configurations which have not been verified during the design of the system, and are thus considered "untrusted," that is, potentially exposing a design flaw. A variant of this embodiment would match "trusted" instead of "untrusted" configurations, that is, only those configurations that have been indeed verified at design time. It is also possible to have embodiments where two state matchers are present together. For example, one may be used to flag untrusted configurations and the second to overrule the first once additional system configurations are verified after the processor is released to the customer. State matchers may also be designed as hardware logic circuits that "match" certain processor configurations and are developed during the design phase of the processor and become part of the final design. Other possible embodiments include those where a recovery controller is triggered directly by a signal controlled directly by a user of the processor, or by an operating system or by firmware routines and no state matchers are used. Obviously, it is possible to use several of the structures above and other embodiments in a network or hierarchical connection within the same design, particularly when this may be needed to address extremely complex systems with large physical layouts. Other configurations are also possible.

As explained below, a range of approaches to selecting signals comprising the processor's control state and evaluating their effectiveness in representing a variety of design errors are analyzed. A metric (average specificity per signal), that encodes the bug detection capability and amount of control state carried by a particular signal set of the processor is also introduced.

FRL may support the detection and correction of multiple design errors with a performance impact of less than 5% if, for example, the incidence of flawed configurations is below 1% of dynamic instructions. In addition, the area impact may be less than 2% for the two microprocessor designs discussed herein and may be much lower than 1% in other embodiments.

In some embodiments, a reliable, low-cost and expressive control logic patching mechanism for microprocessor pipelines is provided. These embodiments may enable the correction of a wide range of control logic-related design bugs in parts deployed in the field after manufacturing. In this framework, when an escaped bug is found in the field, a support team investigates it and generates a pattern describing the control state of the processor which causes the bug to manifest itself. The pattern is then sent to end customers as a patch and is loaded into an on-die state matcher at startup.

The matcher may monitor the state of the processor and compare it to the patterns encoded or stored in the matcher itself to identify when the pipeline has entered a state associated with a bug or a precursor to a bug. Once the matcher has determined that the processor is (or about to be) in a flawed control state, the processor's pipeline may be, for example, flushed and forced into a trusted mode of operation for the execution of the next instruction. As mentioned above, the matcher may also monitor the state of the processor and compare it to its internal patterns to identify when the pipeline has entered a state that has not been verified at design time (before processor release). That is, the patterns may be indicative of verified states of the processor. If the matcher finds the processor to be in a verified state, the processor's pipeline is unaffected. If, however, the matcher finds the processor to be in a non-verified state (it does not find a match), the processor's pipeline may be flushed and forced into, for example, the trusted mode of operation. Other configurations of the matcher are also possible, including those that match the complement of the sets of configurations discussed previously (patterns indicative of non-verified states of the processor, for instance).

In certain embodiments of the degraded or trusted mode of operation, the processor starts execution from the first un-committed instruction and allows only one operation to traverse the pipeline at a time. Therefore, much of the control logic that handles interactions between operations can be turned off, which in turn enables a complete (or more extensive) formal verification of the trusted mode at design time. In other words, it is possible to guarantee that instructions running in this mode complete properly, and thus ensure forward progress, even in the presence of design errors, by forcing the pipeline to run in the trusted mode. After the error is bypassed while operating in the trusted mode, the processor may return to, for example, a high-performance mode of operation or the previous mode of operation until the matcher detects another processor state indicating a bug, a precursor of a bug, a verified and/or a non-verified state.

An additional hardware block, a recovery controller, may be included in certain embodiments to control the mode of operation of the system. In certain embodiments, the recovery controller receives an output signal from the state matcher indicating when a match has been detected between the processor state and a bug pattern. The output of the recovery controller may be connected to the signal that controls the flushing of the pipeline and to the fetch unit of the processor. Most modern processors already include logic to flush a pipeline to manage events such as external interrupts and branch mispredictions. The recovery controller may connect also to this signal to trigger a pipeline squashing when the system must be switched to degraded mode. The recovery controller may also connect to the fetch unit of the processor in certain embodiments where the trusted mode requires regulating the arrival of instructions in the pipeline. In these embodiments, one of the recovery controller's outputs connects to the fetch unit and may disable or enable the fetching of instructions. For example, it may allow only one instruction to enter the processor pipeline at any given clock cycle, or may only allow one instruction in flight at any given time by enabling the fetch unit only when the previous instruction is committed.

For cases where the number of patterns of design errors exceeds the capacity of a particular stored-pattern matcher architecture, a pattern compression algorithm, which compacts the encoded state patterns while minimizing the number of false-positives introduced by the compression process, may be used. As such, errors and combinations of errors relating to particular instructions or combinations of instructions, or that are not associated with any specific instruction (for instance a non-maskable interrupt), may be addressed.

Flow of Operation

Certain embodiments of field-repairable logic may be designed to handle flaws in processor control circuitry for components already deployed in the field. When an escaped error is detected by an end customer, a report containing the error description, such as the sequence of executed operations and the values in the status registers, may be sent to a design house. Engineers on the product support team may investigate the issue, identify the root cause of the error and which products are affected by it, and decide on a mechanism, such as FRL, to correct the bug. By knowing the cause of the bug and which signals are monitored by the matcher in the defective processors, the engineers can create patterns that describe the flawed control state configuration. The patterns may then be compressed by the algorithm presented below, and sent to the customers as a patch. The patches in the end system may be loaded into the state matcher at startup. Every time the patched error is encountered at runtime, a recovery via degraded mode, detailed below, is initiated, effectively fixing the bug. Other embodiments are also possible whereby the patterns are encoded and integrated in the processor at design time. In this latter scenario, the patterns could encode the configurations verified (or not verified) at design time.

Pattern Generation

The pattern to address a design error may be created from the state transition graph (STG) of a device. The correct STG may consist of all the legal states of operation, where each state is a specific configuration of internal signals, that are, for example, crucial to the proper operation of the device. In addition, these states are connected by all the legal transitions between them. Within this framework an error may occur because of an additional erroneous transition from a legal state to an illegal state that should not be part of the STG, or when an invalid transition connects two legal states, or by the lack of a transition that should exist between states.

Hardware support which uses patterns to detect both the illegal states and the legal states which are sources of illegal transitions may be added. A pattern may be a bit-vector representing the configuration of the internal signals that is associated with erroneous behavior of the processor. Note that in this framework a single bug can be mapped to multiple patterns, if it is triggered, for example, by multiple illegal states. To cope with this issue, a pattern compression algorithm, discussed below, may be used.

In certain scenarios, after receiving a bug report, a product support team would analyze the issue, try to reproduce the error and understand what caused it. Tools capable of reducing the length of a simulation trace may be helpful for this analysis, since they can significantly simplify the debugging effort and process. Moreover, some of these tools are capable of investigating alternative scenarios that reach the same bug, thus strengthening the bug characterization. This allows the support team to pinpoint multiple processor control states associated with the bug and identify how these states map to the critical signals that the system will be designed to monitor at runtime. Afterwards, the configurations of the control signals may be compactly encoded and issued as a patch to the end customer. The process may be repeated when new bugs or new scenarios exposing known bugs are discovered.

These patterns may be used in many ways to initiate a system's recovery when they are encountered at runtime. In some embodiments, for example, they may be stored in a state matcher using dynamic storage elements; in others, they may be encoded in the circuit logic implemented or they may used by a firmware or software routine to determine directly when to initiate recovery.

Matching Flawed Configurations

As mentioned above, design errors (or verified states) and patterns describing them may be defined through configurations of control signals of the processor and transitions between these configurations. At run-time these signals may be continuously observed by a state matcher and compared to preloaded patterns describing bugs, pre-cursors to bugs, etc. All of the design's control signals could be used for this purpose. Complexity and stringent timing constraints of modern chips, however, may prevent such extensive monitoring, allowing only for a small portion of the actual control state to be routed to the matcher. Below, techniques to select state bits among the large control state of a processor are presented.

In certain embodiments, the state matcher may be thought of as a fully-associative cache with the width of the tag being equal to the width of the control state vector. The tag in this case is a pattern describing an erroneous configuration or a pattern describing a verified or non-verified configuration. Thus, if such a tag exists in the cache, then a hit occurs and a potential bug is recognized. In certain embodiments, the matcher may be structured to allow the use of "don't care" bits in the patterns to be matched. The don't care bits help to make a compact representation of multiple individual configurations of the critical control state that differ in just a few bits.

Using these embodiments of the state matcher, designers issuing a patch can specify a bug pattern (verified pattern) through a vector of 0's, 1's and don't care bits (x): 0's and 1's represent the fixed value bits, while x's can match any value in the corresponding control signal.

Figure 1:
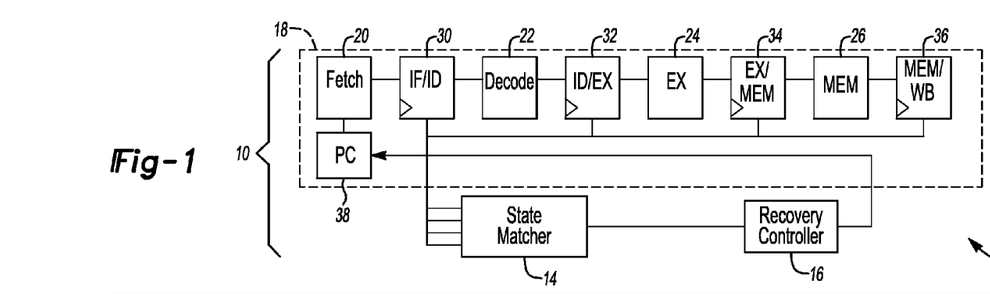
FIG. 1 is a block diagram of a microprocessor, state matcher and recovery controller according to an embodiment of the invention.

Referring now to FIG. 1, an embodiment of a computer 10 encompasses several logic circuits, including a microprocessor 12, a state matcher 14 and a recovery controller 16. The microprocessor 12 includes one or more pipelines as 18. As known to those of ordinary skill, the pipeline 18 includes several stages, e.g., an instruction fetch stage 20, a decode stage 22, an execute stage 24 and a memory access stage 26. The stages 20-26 are separated by respective pipeline latches 30, 32, 34, 36. The latches 30-36 each assume the values output by the preceding pipeline stage after each count of the program counter 38. In other embodiments, however, the logic circuit 12 may have any suitable configuration.

The state matcher 14 may be electrically connected with some of the latches 30-36 and other processor storage elements. As discussed below, the state matcher 14 detects signal values associated with some of the latches 30-36 and other processor storage elements. These signal values form a state vector indicative of the control state of the microprocessor 12.

Figure 2:
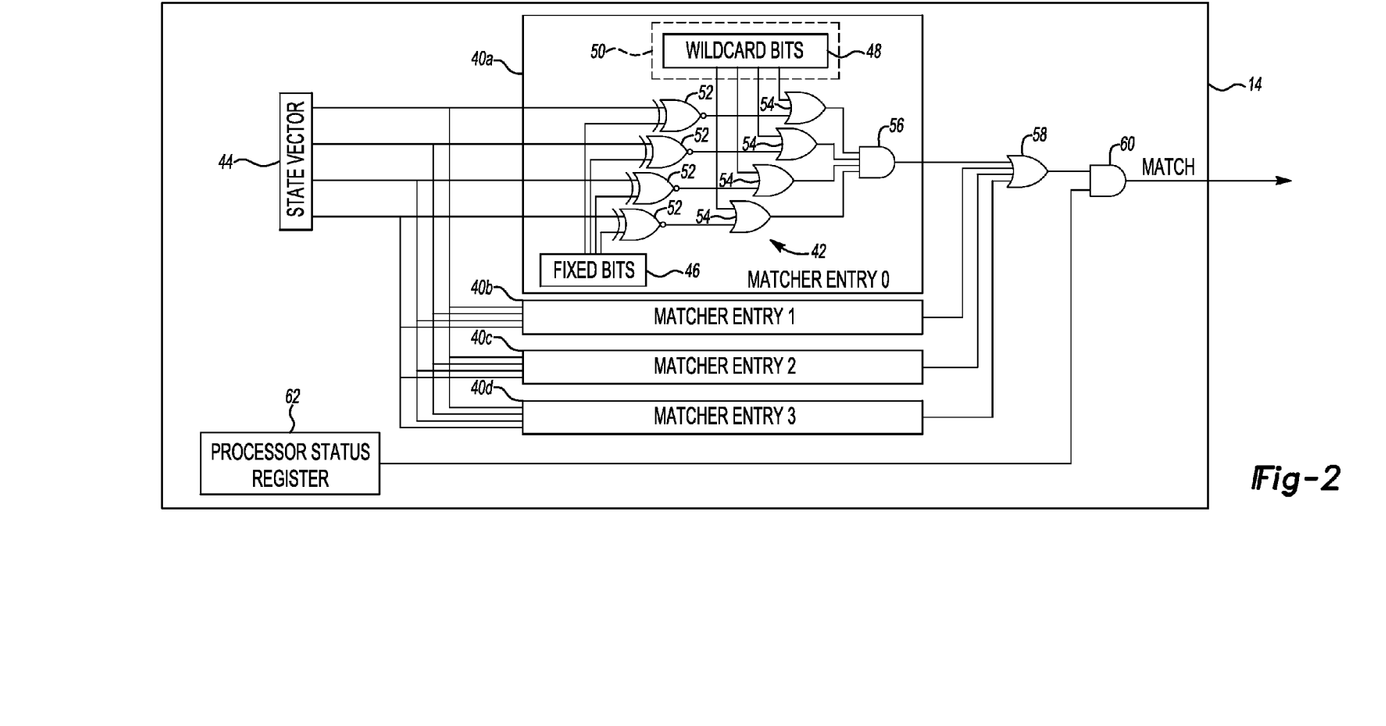
FIG. 2 is a block diagram of the state matcher of FIG. 1.

Referring now to FIG. 2, in certain embodiments, the state matcher 14 includes several matcher entries 40n (40a, 40b, 40c, 40d). In the embodiment of FIG. 2, the state matcher 14 includes four (4) matcher entries 40n. In other embodiments, however, any suitable number of matcher entries 40n may be used. Each of the matcher entries 40n of FIG. 2 includes a set of logic gates 42 configured to compare a state vector 44 with fixed bits 46 and wildcard bits 48 stored in storage cells 50.

In the embodiment of FIG. 2, the logic gates 42 include a set of XNOR gates 52 in series with a set of OR gates 54. The output of the OR gates 54 is fed into a bit-wise AND gate 56. The respective bit-wise AND gates 56 of each of the matcher entries 40n is fed into an OR gate 58 to detect if any of the entries is matched to the processor control state. The output of the OR gate 58 is fed into an AND gate 60 to allow bypassing of the state matcher 14 from a processor status register 62. The processor status register 62 outputs a control signal that controls whether the output of the matcher entries 40n is expressed by the matcher 14. Other embodiments of the state matcher 14 may have a different structure, possibly encoding the patterns in a hardware logic circuit having the match signal of FIG. 2 as output and the control signals as inputs. Another example structure could simply read the match signal from a status register bit deferring the task of asserting and de-asserting this signal to a firmware or software-level application.

A single patch may consist of multiple bug patterns since a single bug may be associated with several patterns, as was mentioned above, or the design may contain multiple unrelated bugs. With reference to the embodiment of FIG. 2, to handle such situations, the matcher 14 includes multiple independent entries 40n. On startup, each of the matcher's entries 40n is loaded with an individual pattern containing fixed bits and don't cares. At run-time, the matcher 14 simultaneously compares the actual control bit values to all of the valid entries and asserts a signal if at least one entry matches the control state subject to the control signal output by the processor status register 62.

The number of entries 40n in the matcher 14 may be set at design time. A larger matcher 14 may be loaded with more patterns; it, however, may also occupy a larger area on the die and may have longer propagation delay. A smaller matcher 14, on the other hand, may not be able to load all of the patterns and compression may be needed.

Pattern Compression Algorithm

Certain embodiments of the algorithm compress a number k of patterns into a state matcher with r-entries, where k>r. This process, however, often over-approximates the bug pattern and introduces false positives, i.e. error-free configurations that will be misclassified as buggy, and incur some performance impact. Nevertheless, this compression may be necessary to fit the patching patterns into an available matcher of smaller size. Note that the compression process will not generate false negatives, that is, it will not re-classify buggy patterns or portions of buggy patterns as non-buggy.

To map k patterns into an r-entry matcher, the algorithm may first build a proximity graph. The graph is a clique with k vertices, one for each of the k patterns, and weighted edges connecting the vertices. Edges have weights associated with them; the weight of each edge may be computed using a variant of the Hamming distance metric between the adjacent vertices. For example, a distance metric may be used whereby patterns are compared bit-wise: each 0-1 pair contributes, for example, 1 to the weight, each 1-x or 0-x pair contributes 0.5 to the weight, and each identical pair (0-0 and 1-1) contributes 0 to the weight. As an example, consider the two patterns 101xx1 and 1001x1 illustrated in FIG. 3A. The two leftmost and two rightmost bits of the patterns are identical, thus they contribute 0 to the weight. Bits 3 of the patterns, on the other hand, form a 0-1 pair, contributing 1 to the weight, while bits 4 form a x-1 pair, making the total weight on the edge between these patterns 1.5.

The reasoning behind this weighing structure is fairly straightforward: if the two patterns connected by an edge were to be compressed into one, every discording pair (0-1, x-0, and x-1) would have to be replaced with an x, basically creating the minimum common pattern that contains both of the initial ones. Matching pairs, however, would retain the values they had in the original patterns. For example, for the two patterns 101xx1 and 1001x1 mentioned above, the common pattern is 101xx1, since there are two discording pairs in the third and fourth bit positions. With this algorithm, each 0-1 pair contributes the same degree of approximation in the resulting entry generated. However, pairs such as 1-x or 0-x, will only have an approximating impact on one of the patterns (the one with the 0 or 1), leaving the other unaffected, hence the corresponding weight is halved.

An exception to the above metric may be a case where one pattern is a subset of another pattern. This is possible because patterns are allowed to have don't care bits that essentially represent both 0 and 1 values. In this framework, the distance between such proximity graph vertices is set to −1, guaranteeing that these vertices will be chosen for compression, and the more specific pattern be eliminated from the graph.

Once the proximity graph is built, the two patterns connected by the minimum-weight edge may be merged together. If r≤k, the compression is completed, otherwise the graph is updated using the compressed pattern just generated, instead of the two original ones, and the process is repeated until a number of patterns that fits in the matcher is left.

Figures 3A, 3B, 3C:
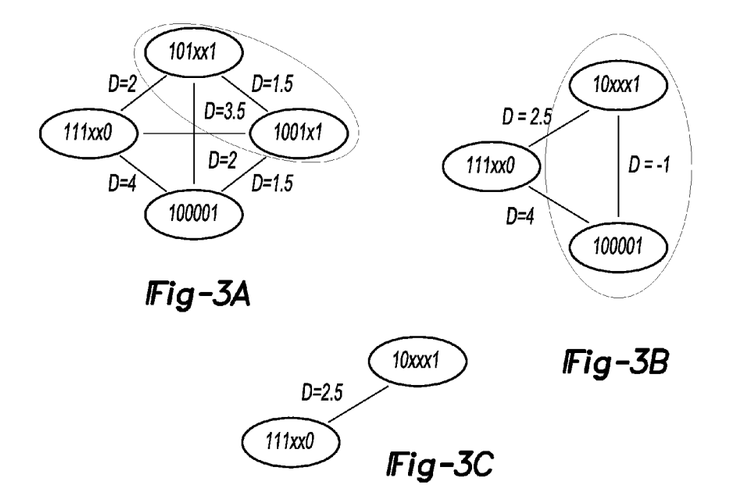
FIGS. 3A through 3C are diagrams illustrating an example pattern compression routine.

An example compression is illustrated in FIGS. 3A through 3C. Here, it is assumed that the goal is to compress four patterns into only two patterns. After the proximity graph is initially built and edges are labeled as illustrated in FIG. 3A, the algorithm selects the edge with the smallest distance (D=1.5) and merges patterns 101xx1 and 1001x1 connected by it as illustrated in FIG. 3B. As discussed above, the resulting pattern is 10xxx1. When the graph is updated after the first step, it has three vertices and is still too large for the matcher. Note, however, that the pattern that was added (10xxx1), completely overlaps pattern 100001, thus the edge between them is labeled with weight −1. When the algorithm searches for the edge with the smallest weight for the second step, this edge is selected and vertex 100001 is eliminated as illustrated in FIG. 3C. Compression then terminates, since the resulting set of patterns can fit into a two-entry matcher similar to the one illustrated in FIG. 2.

Example pseudo-code for the pattern compression algorithm is presented below.

```
1  Patterncompress(input target_size){
2     for each (pattern i)
3        for each (pattern j != i) {
4           if (contains(i,j)) weight (i,j)= −1
5           else weight (i,j) = compute_distance (i,j)
6        }
7     while (num_patterns > target_size) {
8        (i,j) = edge_with_minimum_weight
9        pattern i = merge(pattern i, pattern j)
10       delete pattern j
11       update_graph_weights
12       num_patterns --
13    }}
```

Lines 2 to 6 generate the initial proximity graph by computing the weights of all the edges either by detecting that vertex i contains vertex j (contains function) or computing the distance using the algorithm described above (compute_distance function). Lines 8 to 11 select the pair to merge, remove one pattern from the set and update the graph. The procedure is repeated until the desired number of patterns is reached. Function merge in line 9, generates a pattern that is the minimum over-approximation of the two input patterns. The function first must check for containment, in which case it returns the former one. If there is no containment between the two patterns, their approximation is computed by substituting each non-matching bit pair with a don't care bit (x). It is worth noting that the performance of the algorithm described may be optimized in several ways, for instance by eliminating all edges with D=−1 in the graph at once.

As was mentioned before, the compression algorithm generates a set of patterns that may over-approximate the number of erroneous configurations. The resulting pattern will still be capable of detecting all the erroneous configurations. It, however, may also flag additional known-correct configurations that have been included through the compression (false positives). The impact on the overall system will not be one of correctness, but one of performance, particularly if the occurrence of the additional configurations is frequent during a typical execution. The amount of approximation in the matcher's detection ability is measured by its specificity. The specificity is the probability that a state matcher will not flag a correct control state configuration as erroneous. Specificity may also be thought of as 1−false_positive_rate. Hence, when there is no approximation, the matcher has an ideal specificity of 1; increasing over-approximation produces decreasing specificity values. By virtue of the design and the pattern compression algorithm, the system may not produce a false negative. That is, it may never fail to identify any of the bug states observable through the selected control signals.

Processor Recovery

Referring again to FIG. 1, at this point, the set of patterns generated and compressed may be issued to the end customers as a patch. This may be similar to current microcode patching flow, where a patch for the processor 12 is included into BIOS (Basic Input-Output System) updates. Updates may be distributed by operating system or hardware vendors and may be saved in non-volatile memory on the motherboard. At startup, when BIOS firmware executes, the patches may be loaded into the processor 12 by a special loader. FRL may use a similar mechanism. FRL patches may be approximately the same size as a microcode update (~2 KB or less). After the patch is loaded at startup into the matcher 14, the processor 12 may start running. While none of the configurations recorded in the matcher 12 is detected, activity proceeds normally (this mode of operation may be referred to as high-performance). When a buggy state (or potentially buggy state) is detected, the pipeline 18 is flushed and the processor 12 is switched to a reliable mode of execution.

FIGS. 4A through 4D illustrate an example execution flow when a bug pattern is matched in the FRL-equipped processor 112. (Numbered elements that differ by 100 relative to the number elements of FIG. 1 have similar, although not necessarily identical, descriptions to the numbered elements of FIG. 1.) In this example, a simple in-order single-issue pipeline 118 is considered. It is further assumed that the interaction between a particular pair of instructions INST2 and INST3 triggers a control bug which has been detected and encoded in a pattern already uploaded in the matcher 114.

Figure 4A:
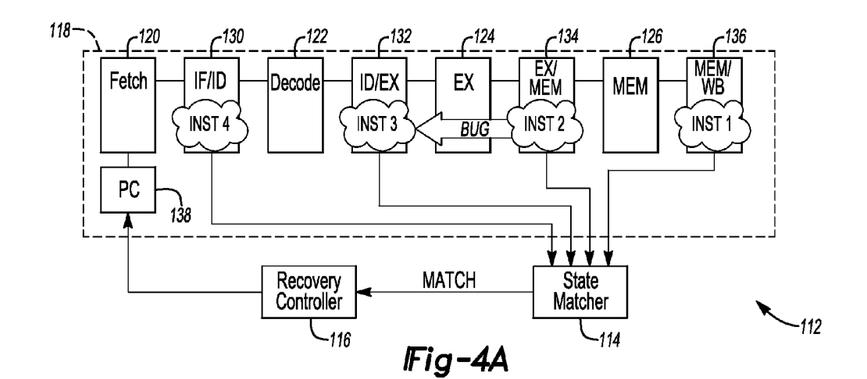
FIGS. 4A through 4D are block diagrams of a microprocessor, state matcher and recovery controller according to another embodiment of the invention.
Figure 4B:
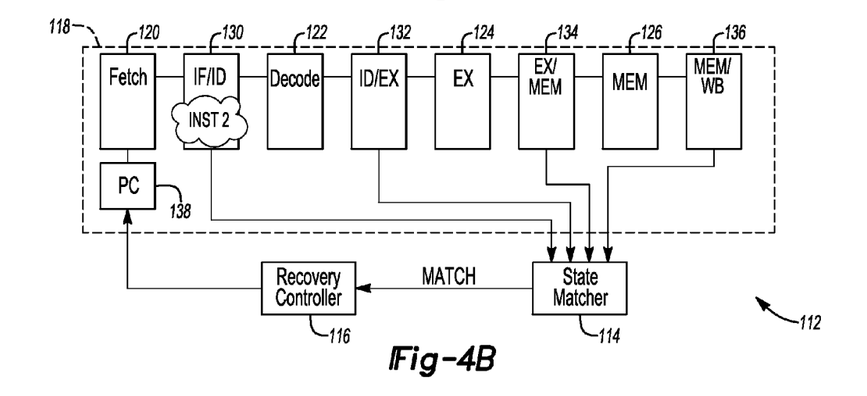
Figure 4C:
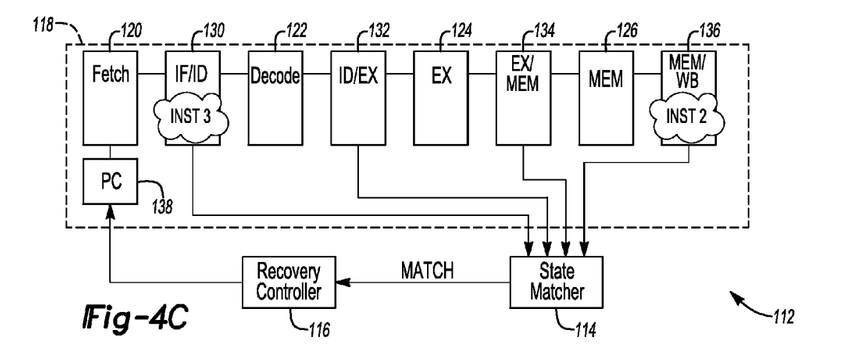
Figure 4D:
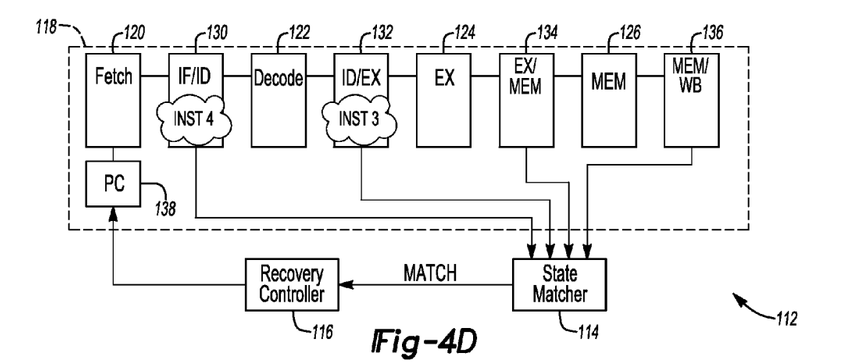

When the pattern is detected by the matcher 114 (FIG. 4A), the pipeline is flushed (FIG. 4B), and the processor 112 is switched to the degraded/trusted mode. This mode is formally verified at design time; hence, it may be relied upon to correctly complete the next instruction (FIG. 4C). Finally, the high-performance mode of operation, or the mode in use before the buggy configuration was detected, is restored (FIG. 4D).

Note that it may be sufficient to complete only one instruction before re-engaging normal operation since, in the event that the pipeline 118 steps again into an error state, it will once again enter the degraded mode to complete the following instruction. On the other hand, a designer may choose to run in trusted or degraded mode for several instructions to guarantee bypassing the bug entirely in a single recovery.

Certain techniques described herein do not introduce new flaws into the processor 112, since the patches only specify when a processor 112 switches to trusted mode. In the worst case, the processor 112 runs in trusted mode all the time, with notable performance impact, but providing correct functionality.

Example

Figure 5:
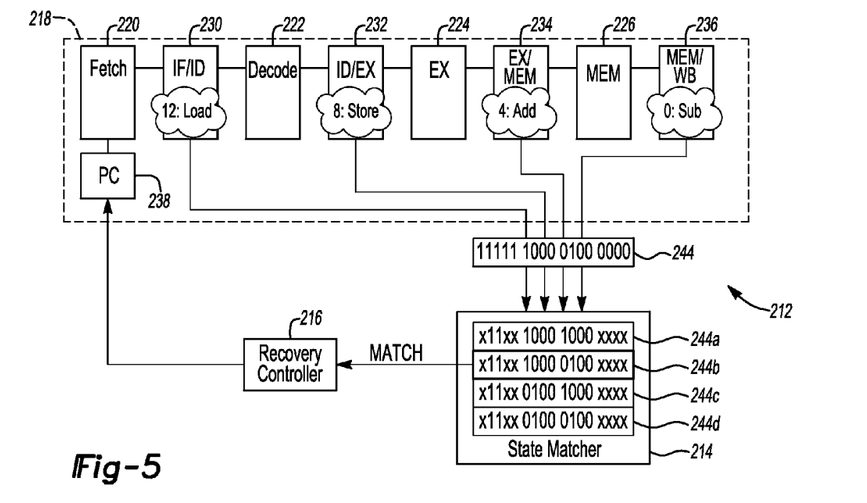
FIG. 5 is a block diagram of microprocessor, state matcher and recovery controller according to yet another embodiment of the invention.

Referring now to FIG. 5, the use of field-repairable logic is shown through an example within the context of a multi-stage pipeline 218. (Numbered elements that differ by 200 relative to the numbered elements of FIGS. 1 and 2 have similar, although not necessarily identical, descriptions to the numbered elements of FIGS. 1 and 2.) In this example, the processor 212 has a flow that does not always enforce a necessary stall between two successive memory accesses. A stall is required for this example design, since all memory operations are performed in two cycles: during the first cycle, the address is placed on the bus and the data from or to memory follows during the second cycle. If a memory operation is followed by a non-memory instruction, they are allowed to proceed back to back, since the second operation does not require memory access while advancing through the memory (MEM) stage 226 of the pipeline 218.

In this example, the program that is being run contains a store and a load back to back, which triggers a bug. The matching logic 214 in this embodiment contains four entries 244a, 244b, 244c, 244d that describe all possible combinations of having two memory instructions in the instruction decode (ID) stage 222 and execute (EX) stage 224 of the pipeline 218. For instance, given the assumed encoding of the instruction set architecture (ISA) for this example processor, the first entry 244a matches valid instructions in the ID and EX stages 222, 224 of the pipeline, which are both memory reads. The second entry 244b matches a store in EX 224 followed by a load in ID 222, which corresponds to the situation triggered during the program execution in the example. The other two entries describe a load followed by a store and two stores back to back. When the situation shown in the example arise, the matcher detects a match with the second entry 244b, the pipeline 218 is flushed, then the recovery controller 216 starts execution at the instruction preceding the store, that is, the first uncommitted instruction. Note that in this case the bug is fully and precisely described by the four patterns loaded in the matcher 214, thus no false-positive matches are produced. Moreover, any attempt to compress this set of patterns using the techniques described herein will introduce false-positives, as can be noted by observing the patterns illustrated in FIG. 5.

Design Flow

Overview of the Design Framework

As mentioned above, verification of complex hardware components, such as microprocessors, relies today on a variety of formal and simulation-based methods. The deployment of FRL technology in a processor design may require the addition of two steps to the mainstream design flow. The first step may require a formal verification of the trusted or degraded mode of operation of the processor (the mode used by FRL to recover from patched design errors.) One embodiment of the trusted mode is set up so that only one instruction is in execution at any point in time in the processor. In this embodiment of the trusted mode instructions do not interact, hence verification is greatly simplified. For the most part this verification effort is reduced to the verification of individual functional blocks, which are, already today, heavily addressed by formal verification techniques. Other embodiments are also possible where the trusted or degraded mode includes a large subset of system components, and possibly allows multiple instructions to be executed concurrently. A requirement of the trusted or degraded mode of operation may be that its execution is fully verified completely, so that at runtime correct forward progress is guaranteed while in this mode. The system-level verification of the entire processor may still be performed using, for example, a mix of random simulation and formal property verification.

The second additional task during the system design may include the selection of the signals that should become part of the control state. These signals are then routed to a state matcher, such as the state matcher 14 illustrated in FIG. 2. The number of entries in the matcher may be subject to a tradeoff between total design area and overall performance of the deployed component, since a smaller matcher may require compression and reduce the processor's performance because of increased false positives.

Verification Methodology

In addressing the formal verification of the trusted mode of operation, a series of optimizations made available by its specific setup may be exploited. In certain embodiments, most of the complex functionality of the processor is disabled in the trusted mode and only one instruction is allowed in the pipeline at any time, greatly reducing the fraction of the design involved in each individual property proof. To this end, it is important to note that it may not be necessary to create a new, simplified version of the design. Instead, all of the simplifications could be achieved either as a direct consequence of the nature of the input stream (only one instruction is in flight at any one time) or by simply disabling the advanced features through a few configuration bits. For example, modules such as branch predictors and speculative execution units can be turned off through dedicated control bits used in many designs to enable and disable features. On the other hand, control logic responsible for data forwarding, pipeline flushing and out-of-order execution may be abstracted away by the formal tools, if the system is constrained so that only one instruction appears in the pipeline at a time, which makes these blocks irrelevant. These two simplifications may make the trusted/degraded mode of operation simple enough for traditional formal verification tools to handle.

In experiments described herein, Magellan from Synopsys was used to verify testbed processor designs. Magellan is a hybrid verification tool that employs several techniques, including formal and directed-random simulation. Since in the testbed designs, the trusted mode forces instructions to be executed independently, Magellan may be used to verify the functionality of each instruction in the ISA, one at a time. For each instruction, assertions in the Verilog hardware design language were written to specify the expected result. Constraint blocks fixed the instruction's opcode and function field, while immediate fields and register identifiers were symbolically generated by Magellan to allow for verification of all possible combinations of these values.

Control Signal Selection

Deploying certain embodiments of field-repairable logic may include determining which control state signals are to be monitored by a matcher. On one hand, it may be ideal to monitor all the sequential elements of a design; given the amount of control state in complex designs, however, such an approach may be either infeasible or extremely costly. As such, the set of control signals may be just a handful, selected among any internal net of the design; although this limitation could potentially be the source of false positives at runtime. Other embodiments may monitor many signals in a distributed fashion through several state matchers, which may be connected together.

An example of the impact of a poor signal selection is discussed below, where a bug, r31-forward (used in the experimental evaluation discussed herein), describes an incorrect implementation of data forwarding through register 31. In the Alpha ISA, register 31 has a fixed value 0, and hence cannot be a reference register for data forwarding. If the control signal set does not include the register fields of the various instructions in execution, it is impossible to repair this bug without triggering all those configurations which require any type of forwarding, causing an extremely high rate of false positives.

At least two possible solutions to address this problem are envisioned. The first and simplest is to monitor the destination register indices of the instructions at the EX/MEM and MEM/WB stage boundaries by including them in the control signal set. The downside of this solution is that the control signal pool would grow and possibly impact the processor's performance. For the in-order experimental testbed described herein, this would be a 30% increase in the signals monitored. An alternative solution entails including a comparator asserting its output when data forwarding on register 31 is detected and including this output signal to the critical set. The additional overhead in this case would be less than the previous alternative. Both approaches would eliminate the false positives for the r31-forward bug and hence improve the processor's performance. Therefore, a designer using certain FRL approaches should keep in mind possible corner cases such as these and design and select his control signal pool for a broad range of bugs. A possible approach for this task consists of analyzing previous designs' escaped bugs to determine which signals are most influential.

Automatic Signal Selection

Since the control signal selection is of importance for certain implementations of FRL, a software tool to support a designer in this task has been developed. The tool considers the register-transfer level (RTL) description of the design and it narrows the candidate pool for the desired control set. It does so by first automatically excluding poor candidates such as wide buses, and then ranking the remaining candidates in decreasing relevance. The rank is computed based on the width of the cone of logic that a signal drives and the number of sub-modules that they feed into. For example, for the following RTL block

```
module example (A, B, C)
    input [64:0] A;
    input B;
    output C;
    assign C = !B & (A == 64'h0);
endmodule
``` the control state selection tool may mark signal A as data, and signals B and C as control. However, B will have a higher control signal ranking, since it drives more signals than C.

When comparing a manually selected control signal set with the output of the automatic signal selector tool, an 80% overlap was observed. It should be noted that the manual selection was performed by a designer who had full knowledge of the micro-architecture, while the automatic selection tool was only analyzing the RTL design.

Below, an experiment comparing the performance, in terms of specificity (precision of the bug detection mechanism), of a range of variants of manual and automatic selection is presented. In particular, the average specificity per signal, or the measure of how much each signal is contributing to the precision of the matcher is observed. Solutions with higher average specificity per signal provide higher specificity, which translates into higher performance, and require less area, for fewer signals need to be routed to the matcher.

Performance-Critical Execution

In some systems, execution performance may be more critical than its correctness. For example, in some real-time systems, it is important to guarantee task completion at a predictable time in order to meet scheduling deadlines. In streaming video applications, the correctness of the color of a particular pixel may also be less crucial than the jitter of the stream. In these situations, field-repairable logic approaches that trade off performance for correctness may be undesirable. For these scenarios, an extra bit, such as the bit exerted by the processor status register 62 illustrated in FIG. 1, may be used to enable/disable the matcher. In some embodiments, the matcher-enable bit, however, should only be modifiable in the highest privileged mode of the processor operation, to ensure that user code cannot exploit design errors for malicious reasons.

Experimental Evaluation

In this section two prototype systems with field repairable logic support are detailed. Using simulation-based analysis, the error detection accuracy of FRL for a number of design error scenarios and varied state matcher storage sizes are examined. Different criteria for selecting the control state, including an automatic selection heuristic outlined above, are also examined. In addition, the area costs of adding this support to simple microprocessors is examined. Finally, the performance impact of degraded mode execution is analyzed, to determine the extent of error recovery that can be tolerated before overall program performance is impacted.

Experimental Framework

To gauge the benefits and costs of the field-repairable logic, this support was added to two prototype processors. Although experimental in nature, these processors have been already deployed and verified in several research projects. While these prototype processors do not have the complexity of a commercial offering, they are non-trivial robust designs that can provide a realistic basis to evaluate the field-repairable logic solution. For the experiments, two variants of the state matcher, with four and eight entries, were implemented and integrated into the two baseline processor designs.

The first design is a 5-stage in-order pipeline implementing a subset of Alpha ISA with 64-bit address/data word and 32-bit instructions. The pipeline had forwarding from MEM and WB stages to ALU and resolves branches in EX-stage. The pipeline utilizes a simple global branch predictor and 256-byte direct mapped instruction and data caches. For this design, 26 control bits were hand picked, which govern operation of different logic blocks of the pipeline (datapath, forwarding, stalling, etc.), to be monitored by the matcher. These signals were selected through a two-step process: documented bugs were studied and then control signals were selected that are good indicators of those bugs. This analysis relies on the assumption that future escaped bugs are correlated to past escapes. In addition, in making the selection, signals were chosen which encoded critical control situations in compact ways: for instance the indices of source and destination registers of each instruction (which require several bits each) were not monitored, but instead occurrence of each data forwarding (only a handful of bits) was tracked. To limit the monitoring overhead, the instruction opcode bits that are marched down each pipeline stage were not monitored. As detailed in Table I below, the majority of the control signals were drawn from the ID and EX stages of the pipeline, where the bulk of computation occurs. For example, in ID stage some of the output bits of the decoder were selected, which represent in compact form what type of operation must be executed, and in EX stage the ALU control signals were selected. Although this potentially limited the capability to recognize a buggy state before the instruction is decoded in ID stage, it allowed for the reduction of the number of bits monitored. Note also that, while the original design was not modified in any way, it could be possible to enhance the specificity of the error detection by adding minimal additional logic. Examples are the solution to the r31-forward bug described above, and also the inclusion of additional pipeline latches to propagate more complete information on the instruction being executed through the pipeline, with the result that it would become possible to capture more precisely the specifics of an instruction leading to a bug.

TABLE I

CONTROL STATE BITS MONITORED IN THE IN-ORDER PIPELINE.

| Name | Number of bits | Pipeline stage |
|---|---|---|
| IF_valid | 1 | Fetch |
| ID_valid | 1 | Decode |
| EX_valid | 1 | Execute |
| MEM_valid | 1 | Memory |
| WB_valid | 1 | Write-Back |
| ID_rd_mem | 1 | Decode |
| ID_wr_mem | 1 | Decode |
| ID_cond_br | 1 | Decode |
| ID_uncond_br | 1 | Decode |
| EX_rd_mem | 1 | Execute |
| EX_wr_mem | 1 | Execute |
| EX_cond_br | 1 | Execute |
| EX_uncond_br | 1 | Execute |
| EX_ALU_function | 5 | Execute |
| EX_br_taken | 1 | Execute |
| EX_hazard_source_a | 2 | Execute |
| EX_hazard_source_b | 2 | Execute |
| MEM_br_taken | 1 | Memory |
| MEM_bus_command | 2 | Memory |
| Total | 26 | |

The second processor is a much larger out-of-order 2-way super-scalar pipeline, implementing the same ISA. The core uses Tomasulo's algorithm with register renaming to re-order instruction execution. The design has four reservation stations for each of the functional units and a 32-entry re-order buffer (ROB) to hold speculative results. The flushing of the core on a branch mispredict is performed when the branch reaches the head of the ROB. The memory operations are also performed when a memory instruction reaches the head of the ROB, with a store operation requiring two cycles. The re-order buffer can retire two instructions at a time, unless one is a memory operation or a mispredicted branch. The design also includes 256-byte direct mapped instruction and data caches and a global branch predictor. The signals hand selected for the control pool include signals from the retirement logic in the ROB as well as control signals from the reservation stations and the renaming logic as reported in Table II.

TABLE II

CONTROL STATE BITS MONITORED IN THE TWO-WAY SUPER-SCALAR OUT-OF-ORDER PIPELINE.

| Name | Number of bits | Pipeline stage |
|---|---|---|
| ROB_head_commit | 2 | Re-order buffer |
| ROB_head_store_address | 1 | Re-order buffer |
| ROB_head_store_data | 1 | Re-order buffer |
| ROB_head_load | 1 | Re-order buffer |
| ROB_full | 1 | Re-order buffer |
| RS_full | 1 | Reservation Stations |
| RS_complete | 2 | Reservation Stations |
| RS_br_miss | 2 | Reservation Stations |
| Issue_branch | 2 | Rename |
| Issue | 2 | Rename |
| Total | 16 | |

Similarly to the in-order design, no opcodes and instruction addresses were monitored, to minimize the number of observed signals. The embodiment of the state matcher developed for this design was capable of correctly matching scenarios involving branch misprediction, memory operations, as well as corner cases of operation of the ROB and reservation stations, for example, when they were full and the front-end needed to be stalled. Again, a larger set of signals could be used to gather more detailed information about the state of the machine, however, for this design, the benefit would consist of a shorter recovery time by recognizing problems earlier on. On the other hand, the ability to identify erroneous configurations precisely would not improve significantly, since errors can still be detected when instructions reach the head of the ROB.

The processor prototypes were specified in synthesizable Verilog, and then synthesized for minimum delay using Synopsys Design Compiler. This produces a structural Verilog specification of the processor implemented with Artisan standard logic cells in a TSMC 0.18 um fabrication technology.

For performance analysis, a set of 28 microbenchmark programs was run, designed to fully exercise the processor while providing small code footprints. These programs included branching logic and memory interface tests, recursive computation, sorting, and mathematical programs, including integer matrix multiplication and emulation of the floating point computation. In addition, both of the designs were simulated for 100,000 cycles with an interactive stimulus generator StressTest to verify correctness of operation as well as provide a more diverse stream of instruction combinations.

Design Defects

To evaluate the performance of the field-repairable logic solution, the designs were equipped with an embodiment of the state matcher as discussed herein, a variety of bugs were inserted into the designs, the appropriate patches were downloaded to the matcher, and then their overall performance was examined. For each bug or set of bugs, a variant of the design that included them was created. In crafting the bugs, the bugs reported in errata documents were emulated. All levels of the design hierarchy were targeted. Usually, high-level bugs were the result of bad interactions between multiple instructions in flight at the same time. For example, opA-forward-wb breaks forwarding from WB stage on one operand, and 2-branch-ops prevents two consecutive branching operations from being processed properly under rare circumstances. Medium-level bugs introduced incorrect handling of instruction computations, such as store-mem-op, which causes store operations to fail. Low-level bugs were highly-specific scenarios in which an instruction would fail. For example, r31-forward is a bug causing forwarding on register 31 to be performed incorrectly. Finally, the multi-bugs are combined bugs, where the state matcher is required to recognize larger collections of bug configurations. For instance, multi-all is a design variant including all bugs that we introduced. A summary of the bugs introduced in both of the designs is given in the Table III. It can be noted that even for these simple designs, some of the bugs require a very unique combination of events to occur in order to become visible.

TABLE III

BUGS INTRODUCED IN IN-ORDER AND OUT-OF-ORDER PIPELINES.

| Bug | Description |
| --- | --- |
| *In-order pipeline* | |
| 2-mem-ops | Two consecutive memory operations fail |
| opA-forward-wb | Incorrect forwarding from WB stage on operand A |
| opA-forward-conf | Incorrect hazard resolution on operand A |
| 2-branch-ops | Two consecutive taken branches fail |
| store-mem-op | Store followed by another memory operation fails |
| load-branch | A conditional branch depending on a preceding load fails |
| mult-branch | A branch following a multiply instruction fails |
| mult-depend | Multiply followed by a dependent instruction fails |
| r31-forward | Forwarding on register 31 is done incorrectly |
| multi-1 | 2-mem-ops + opA-forward-wb + opA-forward-conf + 2-branch-ops |
| multi-2 | store-mem-op + load-branch + mult-branch |
| multi-3 | mult-depend + r31-forward |
| multi-4 | 2-branch-ops + mult-branch + load-branch |
| *Out-of-order pipeline* | |
| rob-full-store | Store operation fails when ROB is full |
| rob-full-mem | Any memory operation fails when ROB is full |
| double-retire | Double-issue and double-retirement in the same cycle fails |
| double-retire-full | Retirement of two instructions fails if two non-branch instructions are added to full ROB at the same time |
| double-mispred | ROB incorrectly flushes the pipeline if two branches are mispredicted at the same time |
| rs-flush | Reservation stations do not get flushed on a branch mispredict if rs_full signal is asserted |
| load-data | Loaded data is not forwarded to dependent instructions in the reservation stations |
| multi-all | All out-of-order bugs combined |

Specificity of the Matcher

The control state matcher has the task of identifying when the processor has entered a buggy control state, at which point the processor is switched into a degraded mode that offers reliable execution. In this section the specificity of the state matcher is studied. That is, its accuracy in entering the degraded mode only when an erroneous configuration is observed.

Figure 6:
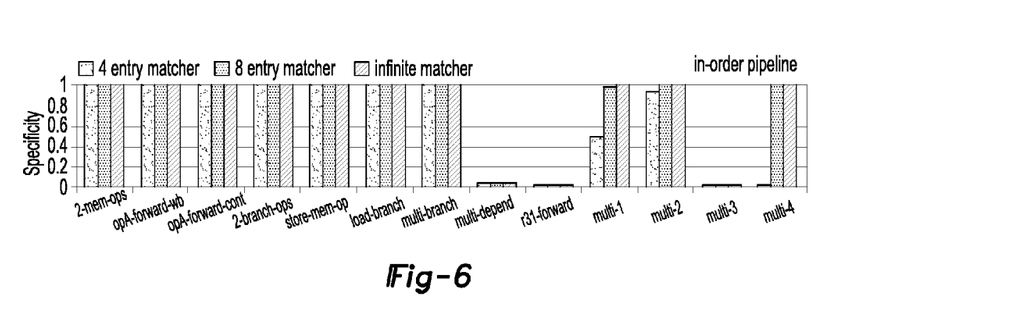
FIG. 6 is a bar chart illustrating several examples of specificity of detection for a range of bugs in an in-order pipeline.
Figure 7:
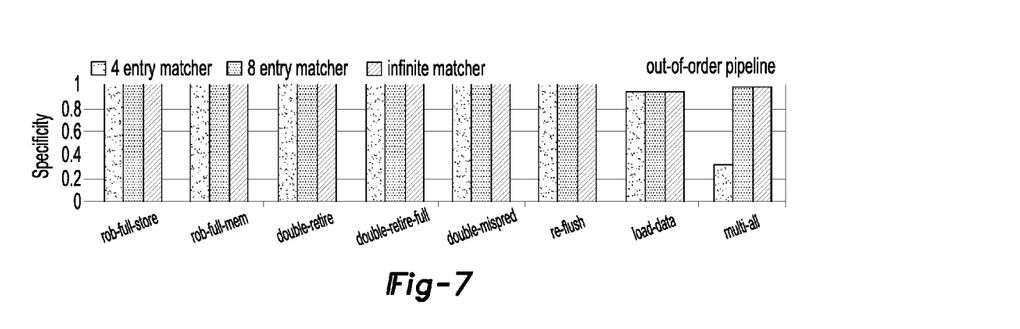
FIG. 7 is a bar chart illustrating several examples of specificity of detection for a range of bugs in an out-of-order pipeline.

FIGS. 6 and 7 graph the specificity of the state matcher for bugs in the in-order and out-of-order processor designs. Recall that the specificity of a bug is the fraction of recoveries that are due to an actual bug. Thus, if the specificity is 1, the state matcher only recovers the machine when the bug is encountered. On the other hand, a matcher with low specificity would be overconservative and enter the degraded mode more often than necessary. For instance, a specificity of 0.40 indicates that an actual bug was corrected only during 40% of the transitions to degraded mode, while the other 60% were unnecessary. In order to gather a sense of the correlation between specificity and matcher size, results considering a 4-entry, 8-entry and a infinite-entry matcher are plotted and discussed below.

It can be noted that for both processors, many of the bugs can be detected and recovered with a specificity of 1.0, even when using the smallest matcher, thus no spurious recoveries were initiated. Some combinations of multiple bugs (e.g., multi-1 and multi-2) had low specificities, but when the matcher size was increased, the specificity reached again 1.0. For these combinations of bugs, a four entry matcher was too small to accurately describe the state space associated with the bugs, but the larger matcher overcame this problem.

Finally, for a few of the bugs, e.g., multi-depend in FIG. 6 and load-data in FIG. 7, even an infinite-size state matcher could not reach the perfect specificity. For these particular bugs, the lack of specificity was not the result of pressure on the matcher, but rather insufficient access to critical control information, as was described above. Thus, these experiments had to initiate recovery whenever there was a potential error, leading to the lower specificities.

To evaluate the impact of various critical control signal selection policies and compare them to the automatic approach described above, a range of FRL implementations were developed over the in-order pipeline using different sets of control signals. The results of this analysis are illustrated in FIG. 8.

In the first configuration developed, single-instr, the control consists exclusively of the 32-bit instruction being fetched. The second solution, called double-instr monitors the instructions in the Fetch and Decode stages (64 instruction bits and 2 valid bits). The third configuration (auto-select) includes all of the signals selected automatically by the heuristic algorithm discussed above for a total of 52 bits. For this set up, the automatic selection algorithm was configured to return all RTL signals with non-zero control rank and width less than 16 bits. The manual-select implementation corresponds exactly to the one from the experiment, including all the signals of Table I, thus its matcher performance is the same as in the experiments above. The final configuration, manual-select w/ID is a manual-select, but it includes 10 extra signals to monitor the destination registers in stages MEM and WB.

Matcher sizes for all of the variants contained a sufficient number of entries to accommodate even the largest patches, so pattern compression was never required. For each design variant, individual patches were developed for the first 9 bugs listed in Table III (all but the multi-bugs). For each bug and each design variant, the average specificity per signal was measured, that is, specificity divided the number of signals in the critical control pool. This measure gives an intuition on how to select the approach with the best performance/area tradeoff.

Figure 8:
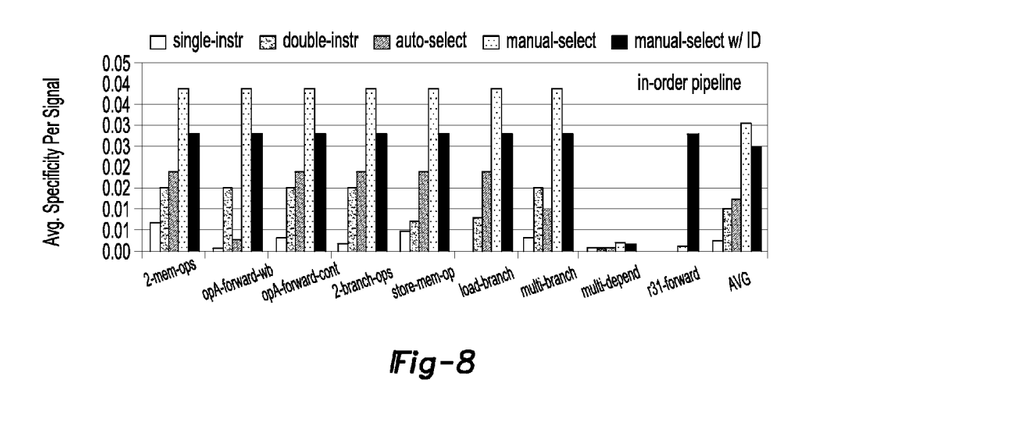
FIG. 8 is a bar chart illustrating several examples of average specificity per signal for a range of signal sets in an in-order pipeline.

As illustrated in FIG. 8, the manual-select variant produces the best results for most bugs. The manual-select/w ID solution has better specificity than manual-select, but at a higher price. Its main advantage is the good result over r31-forward, which is made possible by its tracking destination register indices. Note also that the automatic selection algorithm performs quite well, especially taking into account that this approach does not require any engineering effort.

State Matcher Area and Timing Overheads

Implementing a field-repairable logic solution may require the addition of control matcher logic, that is, the matcher itself and the recovery controller, which may cause an area overhead for the final design. Table IV tabulates the area overheads of a range of FRL implementations, including matcher size of 4 and 8 entries built over both the in-order and out-of-order designs and considering 256 B and 64 kB instruction and data caches. As shown in the table, the overhead of FRCL is uniformly low. Even the larger state matcher, deployed in a processor with a small pipeline and caches (in-order-256 B), results in an overhead of only about 2%. Designs with larger caches and more complex pipelines have even lower overhead. Given the simplicity of the baseline designs discussed herein, it is expected that the overhead for commercial-grade designs would be even lower. Table IV also presents the propagation delays through the matcher block. Note that all solutions have propagation delays that are well below the system's clock frequency, hence they do not impact the overall system's performance when no bug is detected. Note that the matcher for the out-of-order processor performs faster because it monitors fewer control signals. It should also pointed out that, in some embodiments, matching is performed in parallel with normal pipeline operation, and given the observed propagation delays through the matcher, they do not affect the overall design frequency.

TABLE IV

AREA OVERHEADS AND PROPAGATION DELAYS FOR A RANGE OF FRL IMPLEMENTATIONS ON THE IN-ORDER AND OUT-OF-ORDER PIPELINE WHEN SYNTHESIZED ON 180 NM TECHNOLOGY.

| | Critical control state matcher area (% design area) | | | |
|---|---|---|---|---|
| | In-order | | Out-of-order | |
| | 256 B | 64 kB | 256 B | 64 kB |
| 4 entry matcher | 1.10% | 0.01% | 0.34% | 0.01% |
| 8 entry matcher | 2.20% | 0.02% | 0.68% | 0.02% |

| | Propagation delay of the matcher (ns) | |
|---|---|---|
| | In-order (clk = 11.5 ns) | Out-of-order (clk = 6.5 ns) |
| 4 entry matcher | 1.18 ns | 1.17 ns |
| 8 entry matcher | 1.43 ns | 1.21 ns |

Performance Impact of Degraded Mode

Figure 9:
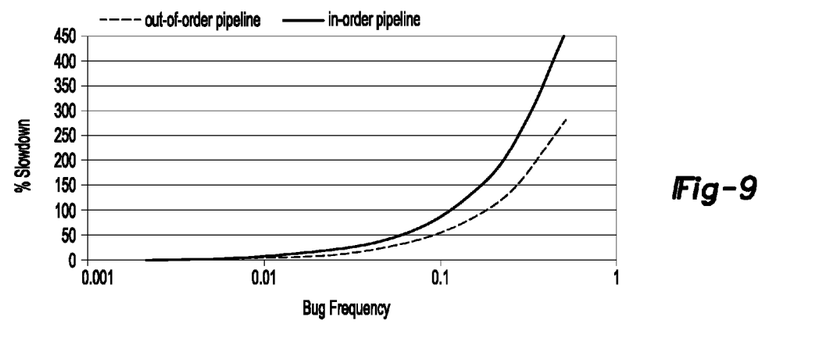
FIG. 9 is a plot illustrating an example impact of recovery on processor performance.

During recovery, the processor is switched into trusted mode to execute the next instruction, and then returned to normal operation or to the mode of operation that was in use before the recovery was initiated. In certain embodiments of the trusted mode, only one instruction is permitted to enter the pipeline, thus instruction-level parallelism may be lost and program performance may suffer accordingly. Other embodiments may also affect overall system performance. FIG. 9 graphs the performance of the in-order and out-of-order processors as a function of increasing recovery frequency. As shown in the graph, for performance impact to be contained under 5%, the rate of recovery should not exceed 6 per 1000 cycles for the in-order pipeline and 1 per 1000 cycles for the out-of-order pipeline. For a more stringent margin of 2% impact, recovery rates should not exceed 2/1000 and 4/1000 for the in-order and the out-of-order processors, respectively. Note that the in-order pipeline suffers more heavily from the frequency of the recovery, as it can be easily derived from its higher sensitivity to instruction latencies.

Figure 10:
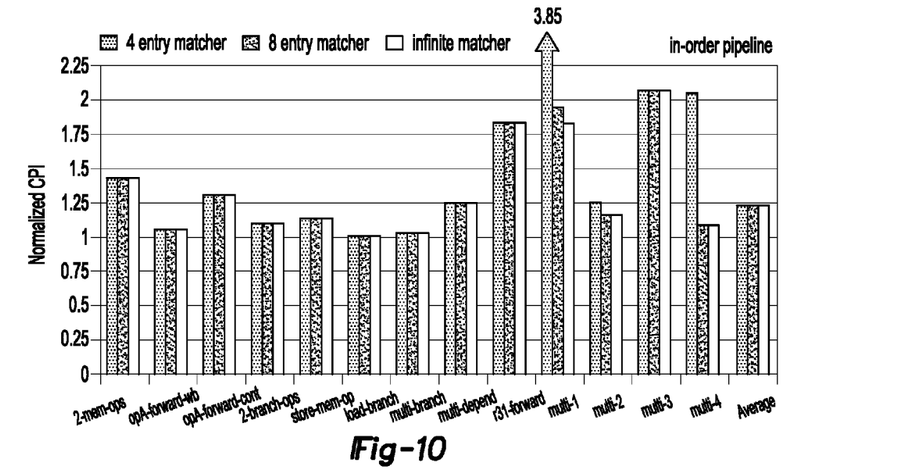
FIG. 10 is a bar chart illustrating several examples of normalized clock cycle per instruction (CPI) for an in-order pipeline.
Figure 11:
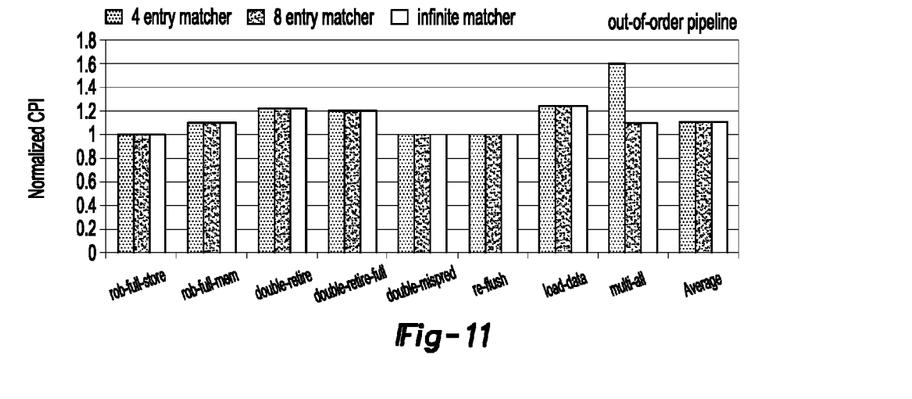
FIG. 11 is a bar chart illustrating several examples of normalized CPI for an out-of-order pipeline.

Finally, FIGS. 10 and 11 show the CPI (clock cycles per instruction) of the FRL-equipped in-order and out-of-order pipelines. The CPI has been normalized to the average CPI achieved when no patch was uploaded on the matcher (hence degraded mode was never triggered). By comparison with FIG. 6, it can be noted that low specificity often results in increased CPI. However, the worst case scenario (4 entry matcher and multi-1 bug) occurs because of an insufficiently sized matcher and not because of the control selection.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for state matching and recovering a microprocessor, the method comprising:
    sampling a plurality of signal values indicative of at least one state of the microprocessor;
    comparing at least some of the signal values with one or more signatures of signal values each representing one or more precursors to an untrusted state of the microprocessor;
    determining whether the at least one state of the microprocessor is in one of the precursors to the untrusted state based on the comparing; and
    initiating reconfiguration of the microprocessor to a trusted state in response to the at least one state of the microprocessor being in one of the precursors to the untrusted state.

2. The method of claim 1 further comprising loading storage cells with the one or more signatures of signal values.

3. The method of claim 1 wherein the at least one state of the microprocessor comprises a microarchitectural state of the microprocessor or a logic circuit state of the microprocessor.

4. A recovery controller for a microprocessor comprising:
    a logic block configured to
        receive a triggering signal (i) that results from a comparison of sampled signal values indicative of a state of the microprocessor with one or more signatures of signal values each representing one or more precursors to an untrusted state of the microprocessor, and (ii) that indicates that the microprocessor is in one of the precursors to the untrusted state,
        initiate reconfiguration of the microprocessor to a trusted feature mode in response to the triggering signal, and
        operate the microprocessor in the trusted feature mode for a period of time to avoid the untrusted state.

5. The recovery controller of claim 4 wherein the logic block is further configured to reconfigure the microprocessor to a full feature mode after the period of time.

6. A method for controlling a logic circuit comprising:
    sampling a plurality of signal values indicative of a state of the logic circuit;
    initiating reconfiguration of the logic circuit to a trusted feature mode in response to a comparison of at least some of the signal values with one or more signatures of signal values, each representing one or more precursors to an untrusted state of the logic circuit, indicating that the state of the logic circuit is a precursor to an untrusted state; and
    operating the logic circuit in the trusted feature mode for a predetermined period of time.

7. The method of claim 6 further comprising reconfiguring the logic circuit to a full feature mode after the predetermined period of time.

8. A state matcher for a logic circuit comprising:
    a logic block configured to detect a precursor to an untrusted state of the logic circuit based on a comparison of sampled signal values indicative of a state of the logic circuit with one or more signatures of signal values each representing one or more precursors to the untrusted state of the logic circuit, and to initiate reconfiguration of the logic circuit to a trusted feature mode.

9. A recovery controller for a microprocessor comprising:
a logic block configured to,
- detect a precursor to an untrusted state of the microprocessor based on a comparison of sampled signal values indicative of a state of the microprocessor with one or more signatures of signal values each representing one or more precursors to the untrusted state of the microprocessor,
- reconfigure the microprocessor to a trusted feature mode in response to the detecting, and
- operate the microprocessor in the trusted feature mode for a predetermined period of time.

* * * * *